Sept. 12, 1939.　　R. A. SANDBERG　　2,172,668
WINDSHIELD REGULATOR ASSEMBLY
Filed July 29, 1938　　2 Sheets-Sheet 1
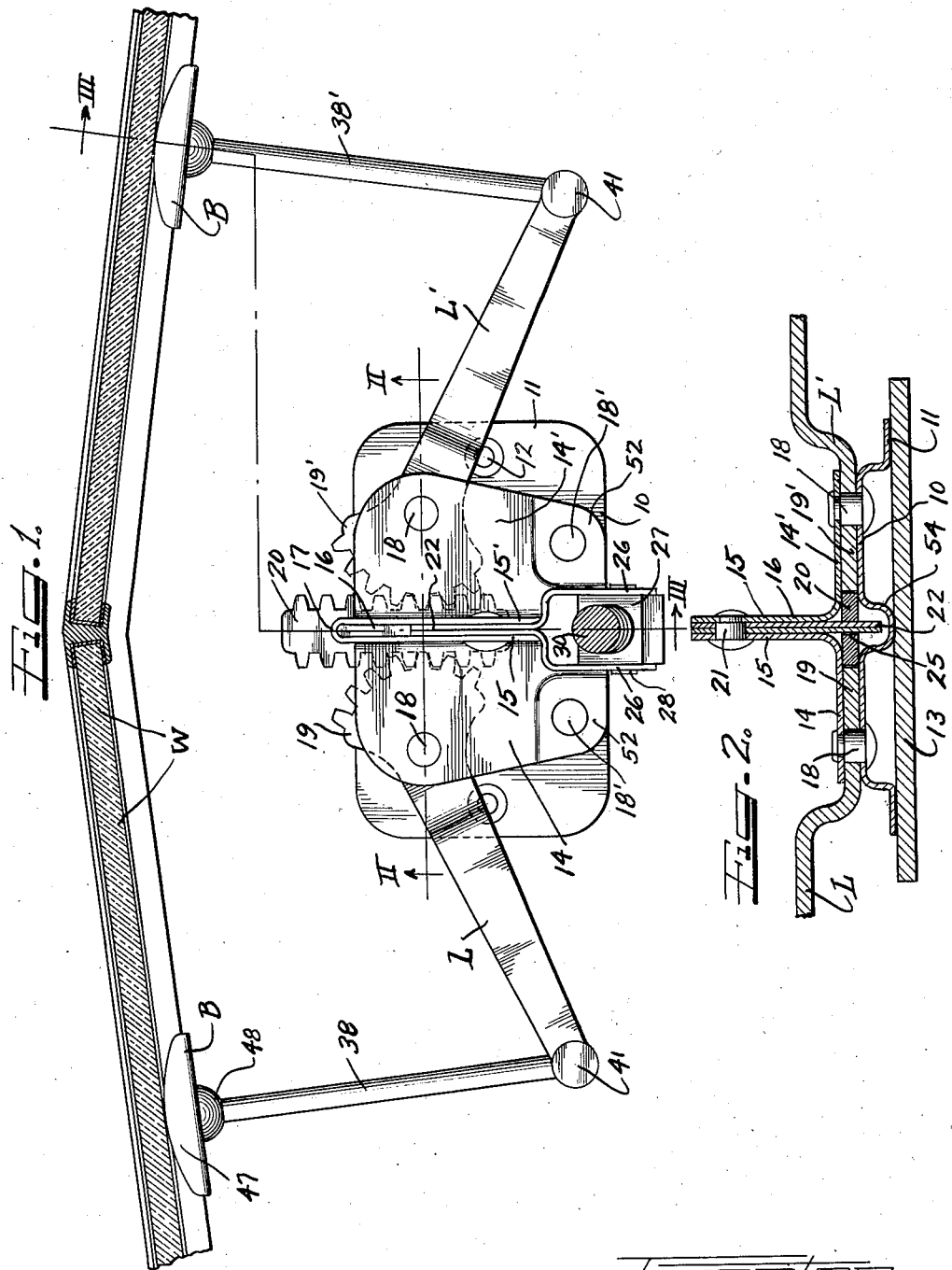

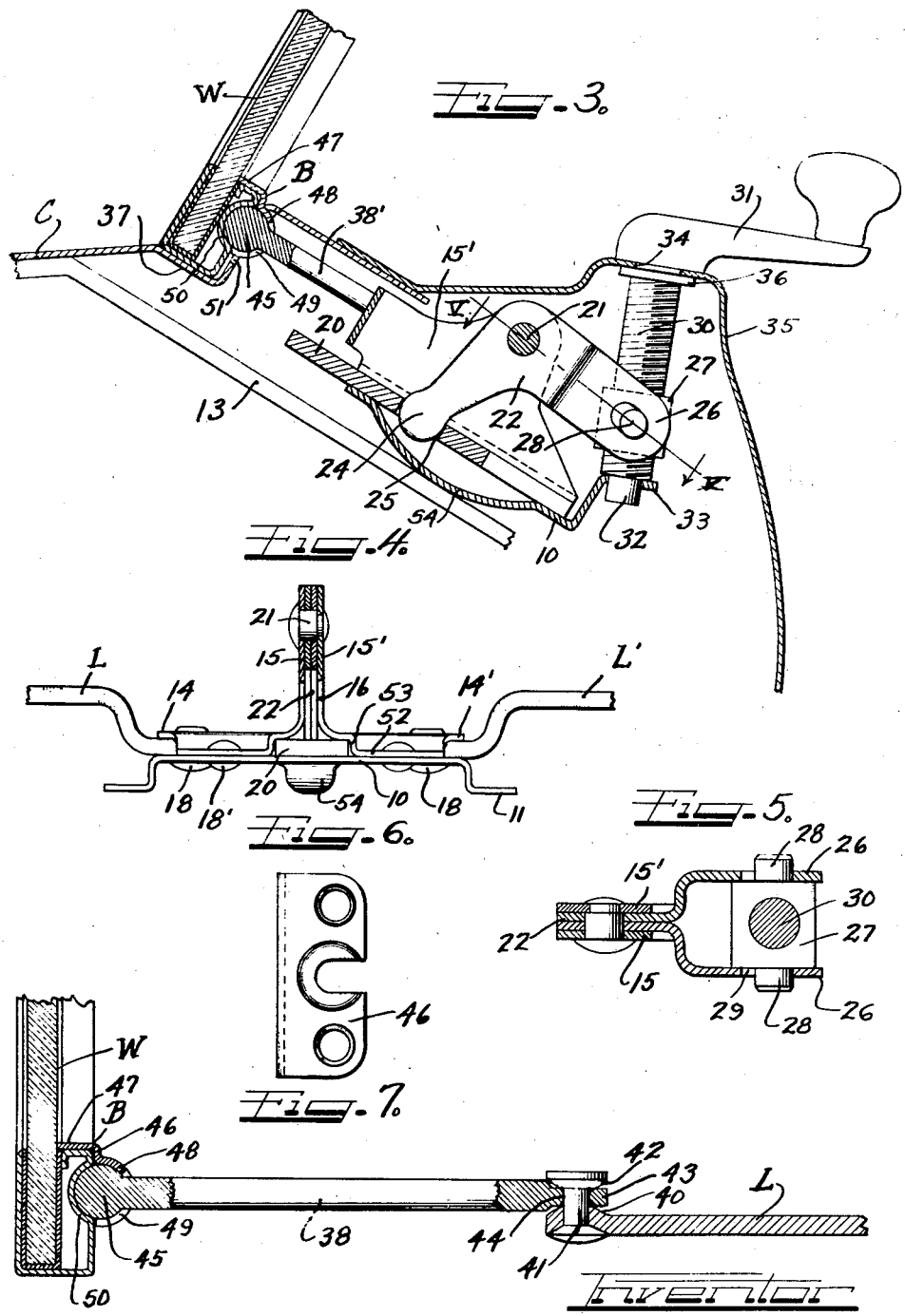

Patented Sept. 12, 1939

2,172,668

UNITED STATES PATENT OFFICE 2,172,668

WINDSHIELD REGULATOR ASSEMBLY

Ray A. Sandberg, Waukegan, Ill., assignor to Houdaille-Hershey Corporation, Detroit, Mich., a corporation of Michigan Application July 29, 1938, Serial No. 221,977

8 Claims. (Cl. 296—84)

This invention relates to windshield regulating mechanism or assembly adapted particularly for use in automotive vehicles for effecting and regulating the opening of the windshield for ventilation purposes.

The regulating mechanism comprises primarily an actuating element manually operable from within the vehicle, and leverage or linkage trains extending from the actuating element and secured to the windshield frame, so that upon operation of the actuating element the windshield may be opened or closed as desired.

An important object of the invention is to provide improved more accessible and more readily operable actuating means with its manually operable actuating lever or handle in a more convenient position for manipulation.

A further object is to provide more flexible lever linkage which will materially reduce the resistance to operation and will eliminate any binding.

A further object is to provide an assembly in which practically all of the parts are in the form of simple stampings of sheet metal which can be readily assembled.

The various features of my invention are shown incorporated in the structure disclosed on the drawings, in which drawings:

Figure 1 is a plan view of the regulator assembly applied to a windshield shown in section;

Figure 2 is a section on plane 2—2 of Figure 1;

Figure 3 is a section on plane 3—3 of Figure 1;

Figure 4 is a front elevation of the assembly;

Figure 5 is a section on plane 5—5 of Figure 3;

Figure 6 is a front elevation of a securing bracket and

Figure 7 is a view partly in section showing the universal joint connections between the lever linkage and brackets.

The mechanism shown comprises a rectangular base plate 10 in the form of a stamping deflected at its ends to form seats 11 having threaded passageways 12 for receiving fastening members such as screws for securing the plate against a suitable support 13 arranged preferably in a plane at right angles to the windshield W.

A cover structure, formed integral from sheet metal, comprises the horizontal base wall portions 14 and 14', and the vertical upstanding walls 15 and 15' spaced apart to form a guide channel 16, the walls 15 and 15' at their rear ends being connected by the bend 17. The base wall portions 14 and 14' are secured by rivets 18 to the base plate 10 but are held spaced by the rivets above the base plate for accommodating the segmental gear ends 19 and 19' of the transmission levers L and L', respectively, the rivets 18 serving as pivots or fulcrums for the levers.

Slidable transversely of the base plate 10 between and meshing with the gear sector ends of the levers is the rack plate 20. The vertical walls 15 and 15', near their upper ends, are secured and held spaced apart by a rivet 21 which forms a fulcrum for the bellcrank lever 22, the depending leg of which lever terminates in a circular end 24 for engaging in a slot 25 in the rack plate 20 so that when the lever is swung on its fulcrum, the rack plate will be longitudinally shifted and the levers L will be correspondingly swung. Preferably the lever structure 22 is built up of two sheet metal stampings which may be welded together, the outer portions 26 of the stampings or plates being deflected to receive between them a nut 27 having trunnion extensions 28 engaging in elongated slots 29 in the stamping ends 26. The nut is threaded to receive a screw 30 extending upwardly and having an actuating member, preferably a crank lever 31, secured to its upper end. The reduced lower end of the screw 32 is journaled in a bracket extension 33 deflected upwardly from the base plate 10, while the screw at its upper end extends through and is journaled in the opening 34 provided in the top wall of the panel structure 35. A washer or collar 36 may be provided on the screw for abutment with the inner side of the panel. The screw and the nut are preferably provided with a multiple thread so that comparatively few turns of the crank 31 will swing the bellcrank lever for operation of the rack bar and transmission levers for full opening of the windshield. With the crank lever 31 mounted on top of the panel structure to rotate in a substantially horizontal plane, it will be out of the way of other control members, for example, the control for the radio, which can be more conveniently operated when located on the front of the panel structure.

The windshield structure is hinged at the top, and when closed, it engages with the sill 37 which may form part of the cowl structure of the vehicle. The levers L and L', at their outer ends, are jointed to links 38 and 38', the outer ends of these links being jointed to fittings or brackets B secured to the windshield frame. The form of joint between the levers and the links is best shown in Figure 7. The end of the lever is deflected to be convex on its outer side to form a bearing surface 40 and is apertured to receive and secure a rivet 41 whose outer end or head is convexed to present the bearing surface 42 opposite the bearing surface 40. The link 38 may be a cylindrical rod having a flat inner end 43 apertured to receive the rivet 41 between the convex surfaces 40 and 42, the link aperture 44 having its side rounded and being of sufficient size so that the link may swing freely relative to the lever through a considerable arc. In other words, the joint formed is more or less of a universal character.

At its outer end, each link is formed to provide a ball 45 for ball and socket connection with the corresponding fixture or bracket B.

Each of the fittings B comprises a front wall 46 to be secured, as by screws, to the side of the windshield frame, and the wall may have a flange 47 for engaging around the edge of the frame. The wall 46 has a substantially semispherical concavity 48 for receiving the link ball 45, the slot 49 permitting passage of the link for engagement of the ball in the concavity. The windshield frame is provided with a concavity 50 which, with the concavity 48, forms a socket for the ball 45. The cowl or dash structure C is cut away to provide openings 51 for passage of the links 38.

The windshield shown is of the V-type and the bracket structures B are secured to the windshield frame at points equidistant from the apex of the shield. When the windshield is closed, its frame seats on the sill 37. When the crank handle 31 is turned, the bellcrank lever 22 shifts the rack plate inwardly for outward swing of the levers L and L', this movement being communicated through the links 38 to the windshield for opening movement thereof, and the thread engagement of the screw 30 with the nut 27 is self-locking so that the windshield will be rigidly held in its adjusted position. To assist in the guiding the rack plate at the inner end of its travel, the inner corner portions 52 of the walls 14 and 14' may be deflected downwardly against the base plate 10 to form the guide walls 53 for the rack plate, the deflected portions being held against the base plate 10 by the rivets 16'.

To provide clearance for the lower projecting end of the lever 22, the base plate 10 is deflected down to provide the trough 54.

The universal joint connection between the levers L and L' and the links 38 and 38', and the universal connection of the links with the windshield brackets will permit the linkage to follow the movements of the windshield without friction in the linkage and without binding, so that the adjustment and regulation of the windshield can be manually accomplished with little exertion.

I have shown a practical and efficient embodiment of my invention but I do not desire to be limited to the exact details of construction and arrangement and operation shown and described as changes and modifications may be made without departing from the scope of the invention.

I claim as follows:

1. A windshield regulator assembly comprising a supporting structure, levers pivoted on said supporting structure and having gear segment ends, a rack plate meshing with the lever gear ends and movable to cause swing of said levers, an actuating lever engaging at one end with said rack plate, a screw having threaded engagement with the other end of said actuating lever so that turning of said screw will effect shift of said rack plate by said actuating lever and swing of said gear levers, and links extending from the ends of said geared levers for connection with a windshield.

2. A windshield regulator assembly for regulating the opening of a windshield structure, comprising a support, toothed levers pivoted on said support and having teeth at their opposed ends, a rack plate having teeth meshing with the lever teeth and shiftable on said support for swing of said levers, a bellcrank lever having one end engaging said rack plate, a threaded element supported by the other end of said bellcrank lever, a screw engaging said threaded element and having an operating handle, and links extending from the outer ends of said toother levers for engagement with the windshield to be regulated.

3. A windshield regulating assembly for regulating the opening of the windshield of an automobile, comprising a support, transmission levers pivoted on said support and extending from opposite sides thereof and provided at their opposed inner ends with teeth, a rack plate meshing with said teeth and slidable on said support for swinging said levers, links extending from the ends of said transmission levers for connection with the windshield to be regulated, an actuating lever movable in a plane at right angles to the plane of movement of said transmission levers and fulcrumed on said support, one end of said actuating lever having engagement with said rack plate for shift thereof when the actuating lever is turned, a nut supported by the other end of said actuating lever, a screw member engageable with said nut and having an operating handle, turning of said screw effecting the movement of said actuating lever.

4. A windshield regulator assembly for regulating the opening of the windshield in an automotive vehicle, comprising a support adjacent to the windshield, actuating levers pivoted on said support and extending in opposite directions therefrom, the adjacent inner ends of said levers being provided with teeth, a rack plate meshing with the teeth of said levers and shiftable on said support for effecting swing of said levers, links extending from the ends of said levers for connection with the windshield to be regulated, a bellcrank lever operable in a plane at right angles to the plane of movement of said transmission levers and fulcrumed on said support, one end of said bellcrank lever having engagement with said rack plate to effect shift thereof when the bellcrank lever is turned, a nut trunnioned to the other end of said bellcrank lever, a panel structure above said support, a screw member extending downwardly from said panel structure for engagement with said nut and provided at its upper end with an operating handle, and an extension on said support for supporting the lower end of said screw member.

5. A windshield regulator assembly for regulating the opening of the windshield of an automotive vehicle, comprising a support having upper and lower supporting plates, transmission levers pivoted to said support between said plates and provided with teeth along their adjacent inner ends, a rack plate meshing with said lever teeth and shiftable between the upper and lower plates of said support for effecting swing of said levers, walls extending upwardly from the upper plate of said support, a lever between said walls and fulcrumed thereto, one end of said lever engaging said rack plate and a screw member having screw engagement with the other end of said lever whereby turning of the screw member will effect shift of said rack plate and swing of said transmission levers, and links extending from the outer ends of said transmission levers for connection with the windshield to be regulated.

6. A windshield regulator assembly for regulating the windshield of an automotive vehicle, comprising a support having lower and upper plates, transmission levers pivoted to said support between said plates and extending in opposite directions therefrom and provided at their inner ends with teeth, a rack plate shiftable on said support between said plates and meshing with said transmission levers for effecting swing thereof, parallel upstanding walls on said upper plate, a bellcrank lever between said walls and fulcrumed to the upper end thereof, said lever comprising two plates welded together, one end of said lever having engagement with said rack plate, the plates at the outer end of said bellcrank lever being spaced apart, a nut trunnioned between and to the spaced apart ends of said bellcrank lever, a screw member engaging said nut and provided with an operating handle, and links extending from the outer end of said transmission levers for connection with the windshield to be regulated.

7. A regulating assembly for swinging the windshield of an automotive vehicle to open or closed position, comprising a support, transmission levers pivoted on said support and extending laterally from opposite sides thereof, an actuating plate slidable on said support and interconnected with the inner ends of said levers whereby shift of said plate on said support will effect swing of said levers, an actuating lever fulcrumed on said support for movement in a plane at right-angles to the plane of movement of said transmission levers, one end of said actuating lever having engagement with said actuating plate for shift thereof when the actuating lever is turned, screw means cooperable with the other end of said actuating lever for effecting turning thereof, and links extending from the ends of said transmission levers for connection with the windshield to be regulated.

8. A regulating assembly for regulating the opening of the windshield of an automobile, comprising a support, transmission levers pivoted on said support and extending laterally from opposite sides thereof, an actuating plate shiftable on said support and interconnected with said transmission levers to effect swing thereof when the plate is shifted, a bell crank lever fulcrumed on said support for operation in a plane at right-angles to the plane of swing of said transmission levers, one end of said bell crank lever engaging said plate for shift thereof when said lever is turned, a panel structure above said support, screw means cooperable with the other end of said crank lever and extending upwardly through said panel and there provided with an actuating handle, and links extending from the ends of said transmission levers for engagement with the windshield to be regulated.

RAY A. SANDBERG.